March 19, 1940.  W. J. VOIT ET AL  2,194,132
REINFORCED BALL AND METHOD OF MAKING SAME
Filed Dec. 8, 1937  2 Sheets-Sheet 1
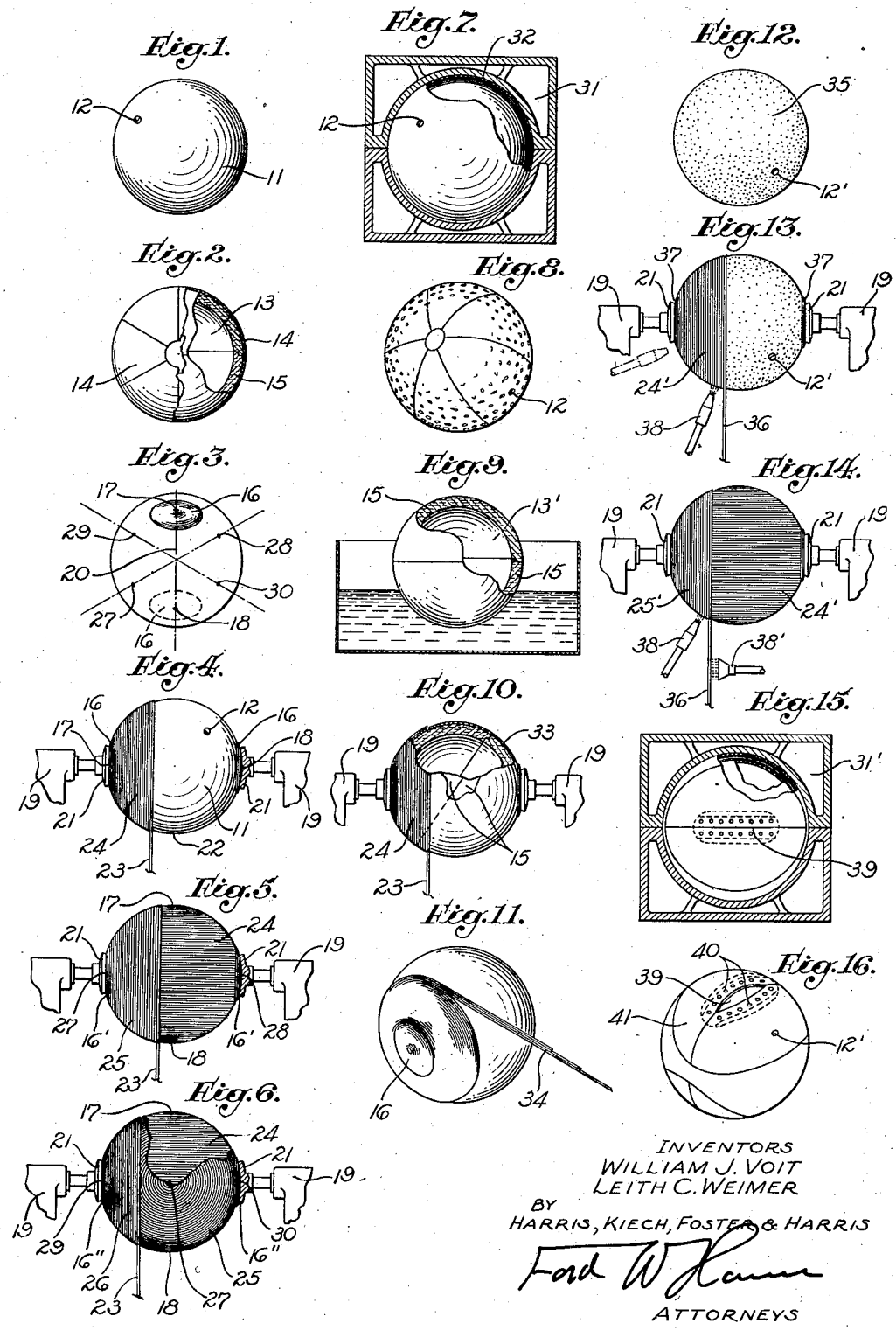
INVENTORS
WILLIAM J. VOIT
LEITH C. WEIMER
BY
HARRIS, KIECH, FOSTER & HARRIS
ATTORNEYS March 19, 1940. W. J. VOIT ET AL 2,194,132
REINFORCED BALL AND METHOD OF MAKING SAME
Filed Dec. 8, 1937 2 Sheets-Sheet 2
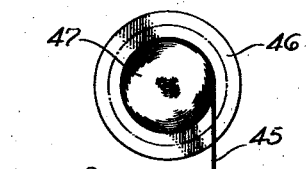
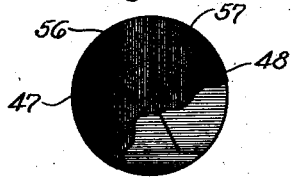
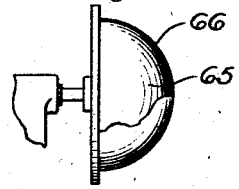
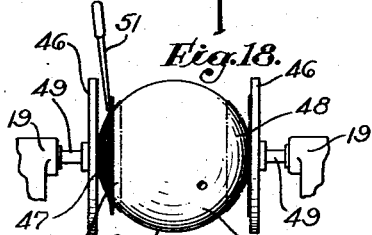
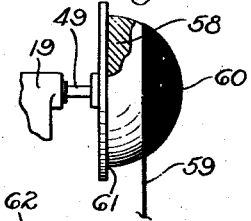
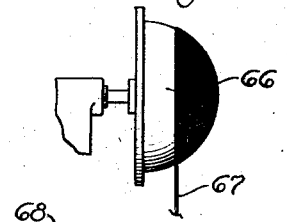
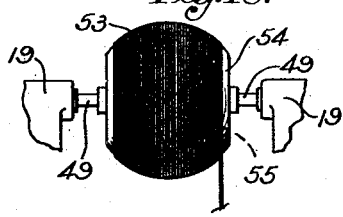
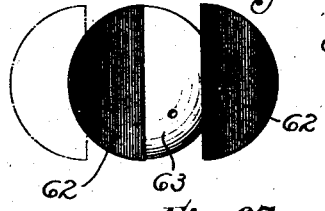
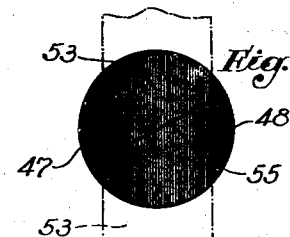
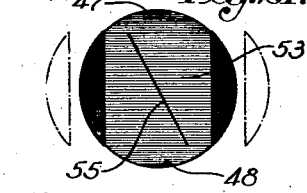
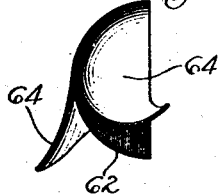
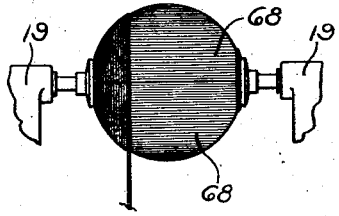
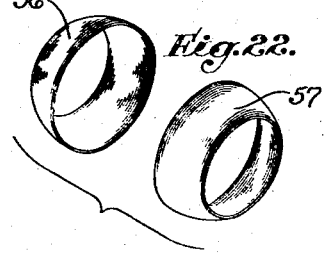
INVENTORS
WILLIAM J. VOIT
LEITH C. WEIMER
BY HARRIS, KIECH, FOSTER & HARRIS
*Fred W. Harris*
ATTORNEYS Patented Mar. 19, 1940

2,194,132

UNITED STATES PATENT OFFICE 2,194,132

REINFORCED BALL AND METHOD OF MAKING SAME

William J. Voit, Los Angeles, and Leith C. Weimer, Southgate, Calif., assignors, by mesne assignments, to William J. Voit, Los Angeles, Calif.

Application December 8, 1937, Serial No. 178,748

6 Claims. (Cl. 154—16)

This invention relates to balls and to methods of making the same.

It relates particularly to that class of hollow athletic balls which comprises a central bladder to provide a means of inflation, an intermediate wall of relatively non-stretchable material, to give the ball a definite size and shape, and an outer protective covering of rubber, leather or other material, to resist surface abrasion and wear.

In these athletic balls, it is desirable to provide an intermediate, relatively non-stretchable wall which shall act as a reinforcement to resist internal pneumatic pressure to prevent enlargement of the ball, either a uniform enlargement undesirably increasing its diameter or a localized enlargement deforming it from its proper shape, spherical or otherwise. In prior practice, this intermediate reinforcing layer has been constructed in two fashions. Either woven textile material has been cut to small pieces of various configurations and applied to the inner bladder of the ball or to a form, and bonded in lapped or butted joints with suitable bonding material, such as vulcanizable rubber cement; or, elongated fibrous material, such as thread or yarn, has been wound upon the inner bladder or upon a form in great circles and circles approximating great circles crossing and recrossing each other in every direction.

It has been found difficult and expensive to employ the first method, since, when flat pieces of fabric are laid upon a curvilinear surface, either the central portion of each piece is stretched more than the edge portions or the edge portions present folds. Correspondingly either the bladder is deformed or the reinforcing layer is of uneven thickness. It has also been found difficult with this method to firmly unite contiguous pieces of fabric. Lap joints present an uneven surface. Butt joints require accuracy in cutting and fitting the pieces and also such joints are difficult to make so as to afford a strong tension-resisting union.

In using the second method of winding thread in great circles, it has been found difficult to wind the thread upon a bladder, because of the non-rigid character of the bladder, and even when the thread is wound upon a solid form, the resultant layer presents an uneven erose surface, upon which it is difficult to mold or apply a cover; furthermore the body of the layer contains interstices and is relatively thick and heavy for any given degree of tensile strength.

In following our invention thread, cord, yarn, strips of fabric or other elongated material, preferably rubberized either before or after application, is wound, preferably without tension, in contiguous coils or convolutions of gradually increasing diameter, and preferably in a continuous spiral, beginning at one polar point and passing over the median equatorial great circle, and then in circles of gradually decreasing diameter until the opposite polar point is reached. This winding produces a layer of an even thickness, which is equal to the diameter of the thread, cord or yarn or to the thickness of the fabric as the case may be. A second winding is then applied to the first winding, with its polar axis perpendicular to the polar axis of the first winding. A third winding is then applied to the second winding, with its polar axis perpendicular to both the first two axes. It is an object of our invention to provide by this construction a reinforcing layer which shall have with a minimum of thickness and weight a maximum of tensile strength in all directions, and which shall have a smooth exterior face upon which to apply a leather or rubber cover. It is also an object of our invention to provide by this method, a rapid, simple and workmanlike way of applying the thread, with a minimum of labor, to an inflated bladder or to a form. When the elongated material is wound without appreciable tension, our method has an advantage in that the flexible bladder is not pressed in or distorted thereby.

In the preferred form of our invention, these reinforcing layers formed of rubberized thread wound as above described surround a rubber bladder and are covered with a rubber cover, and the whole is vulcanized into one integral structure, either by one operation after the several elements of the ball are completely assembled, or in a series of vulcanizing operations at various stages in the building of the ball. It therefore is a further object of our invention to provide a ball which shall combine inflatability, tensile strength, light weight and uniform elasticity, with resistance to abrasive wear and deformation, and resistance to internal breakdown. It is a further object to provide a practical, inexpensive method of manufacturing a ball with these qualities.

While the principal feature of our invention is usable with any type of outer cover, we prefer to make the outer cover of rubber, which not only resists surface wear, better than leather or other materials, but provides a waterproof casing for the ball which prevents the entrance of water, dirt and other deleterious matter into the substance of the intermediate layer, where such foreign matter would cause decay and mechanical destruction with resultant disintegration of the material of this intermediate layer.

Other objects and advantages of our invention will be disclosed and apparent from the following description and drawings, of whch:

Fig. 1 shows a bladder, inflated preparatory to the manufacture of an athletic ball in accordance with the principles of our invention.

Fig. 2 shows partly in section a ball form with a bladder placed thereon.

Fig. 3 shows a bladder with polar disks, applied thereto.

Fig. 4 shows a bladder mounted in a lathe and with a portion of the primary winding in place.

Fig. 5 shows the bladder in a lathe, with the primary winding complete and a portion of the secondary winding in place.

Fig. 6 illustrates the manner of applying the tertiary winding.

Fig. 7 shows the ball in a vulcanizing mold after application of all three windings and rubber cover.

Fig. 8 shows the completed ball.

Fig. 9 shows a form in process of being dipped in a liquid rubber bath to make a bladder.

Fig. 10 shows the form of Fig. 9 with the bladder formed thereon, and the primary winding being fed to the ball.

Fig. 11 shows a modified method of feeding the thread to the ball.

Fig. 12 shows a cured rubber bladder ready for a modified method of manufacturing the ball.

Fig. 13 shows the primary winding being applied to the bladder of Fig. 12.

Fig. 14 shows the secondary winding being applied to the bladder of Fig. 13.

Fig. 15 shows the method of vulcanizing the ball shown in Figs. 12 to 14.

Fig. 16 shows the completed ball after being vulcanized as shown in Fig. 15.

Fig. 17 shows a plan view of a machine for making the disks of thread used in another method of manufacturing the ball.

Figs. 18 to 21 are side elevational views of the ball illustrating additional steps in manufacturing the ball in accordance with the method of which the first step is shown in Fig. 17.

Fig. 22 is a perspective view of bands prepared to cover the central portion of the bladder in accordance with a modification of the method shown in Figs. 17 to 21.

Fig. 23 is an elevational view of the ball illustrating the method of application of the bands shown in Fig. 22.

Fig. 24 is an elevational view of a solid hemispherical form, shown partly in section, mounted in position on a lathe, upon which the primary winding is being applied in accordance with still another method of practicing our invention.

Fig. 25 is a perspective view of the hemispherical cups formed by the process depicted in Fig. 25.

Fig. 26 is an elevational view showing the method of applying these cups to a bladder.

Fig. 27 is a sectional elevational view showing an alternative method of assembling the hemispherical cups, manufactured in accordance with the process shown in Figs. 24 and 25, and the inner and outer rubber walls.

Figs. 28, 29, 31, and 32 are elevational views and Fig. 30 is a perspective view depicting the steps followed in utilizing still another modification of the process of making a ball in accordance with our invention, in which the inner rubber wall is formed in herispherical cups upon molds, each separately wound with one layer of thread, then joined and supplied with additional windings of thread.

In the following description, it will be convenient for reference purposes to speak of the poles and the equator of an athletic ball.

It will also be convenient to refer to "latitudinal" lines and to "latitudinal" coils or convolutions. As we have used it herein, the adjective "latitudinal" means, of which all points are at an equal angular distance from a polar point".

The term "athletic ball" as used herein is intended to include any ball used for play or exercise or athletic purposes, such as baseballs, tennis balls, footballs, basket balls, volley balls, soccer balls, push balls, and golf balls.

While the ball depicted in the drawings is spherical, our invention is also applicable to athletic balls which are either elliptical in longitudinal cross section or of some other shape suitable to the purpose for which they are designed. Whenever words applicable to a spherical ball appear in this description, it will be understood that it is for convenience of description only, and that corresponding words applicable to some other shape may be substituted throughout.

Fig. 1 shows a cured or semi-cured rubber bladder 11 having an inflating valve 12 of standard construction. This bladder is inflated to a size having a radius which is less than the radius of the finished ball by an amount approximately equal to the total thickness of the layer or layers of material which are to be applied thereto in subsequent steps of manufacture. Instead of an air-filled bladder 11, there may be provided, as a core upon which to build the ball, a hollow thin-walled uncured rubber ball or bladder 14 formed in any suitable manner, from segments or otherwise, upon a solid form 13. This form may be solid, but we prefer to make it in two hemispherical shells 15 fitted together at their rims to prevent relative displacement and held together by the ball 14. The material of the form 13 is a substance such as cetyl alcohol, certain waxes, paraffines, and other substances which have a temperature of liquefaction somewhere between the atmospheric temperature of the manufacturing room and the temperature of vulcanization.

Two small discs 16 are made by feeding thread coated with rubber cement to a revolving plate in a manner to be described hereinafter and illustrated in Fig. 17, preferably beginning at the center of the plate and working outwardly until a disc of relatively small diameter has been made, or these discs 16 may be small circular pieces cut from woven fabric. They are applied to the bladder, which has been previously coated with rubber cement, at two polar points diametrically opposite each other, as indicated at 17 and 18, Fig. 3, and adhere thereto through the action of the rubber cement. The bladder is then placed in a lathe 19, with the axis 20 of the polar points 17, 18 coincident with the axis of the lathe, and the discs 16 in position under lathe chucks 21. The diameter of the discs is slightly larger than that of the chucks.

Thread, cord, yarn, strips of fabric, or similar elongated fibrous material 23, is wound upon the bladder from a thread feeding machine (not shown) in contiguous latitudinal coils or convolutions, beginning at the edge of one disc 16 and continuing up and over the equatorial great circle 22 and down to the other disc 16. Preferably, this thread is coated with latex or other rubber cement material prior to its application to the ball. The thread may be passed through a bath of the coating material as it passes from the feeding machine to the bladder, or the thread may be sprayed with the material just as it is applied to the bladder, or the bladder may be dipped in the material before or after it has received its first winding of thread and has been removed from the lathe 19.

This first or primary winding is designated in the drawings with the numeral 24. The bladder, after the primary winding 24 of rubberized thread has been completed, is removed from the lathe and two additional small discs 16' are applied to the outer surface of the winding 24 at two diametrically opposite polar points 27 and 28 at an angular distance of 90° from the first polar points 17 and 18. The axis connecting points 27 and 28 is perpendicular to the axis connecting points 17 and 18. The bladder is then replaced in the lathe 19, or in a similar lathe, with discs 16' against the lathe chucks 21. A secondary winding 25 is then applied in the same manner as before.

After the secondary winding has been completely applied, the ball is removed from the lathe, two additional discs 16" are applied to the ball at two diametrically opposite points 29 and 30 of which the connecting axis is perpendicular to both the axes of points 17 and 18 and points 27 and 28. A tertiary winding of thread is applied in the same manner as were the primary and secondary windings and the ball is removed from the lathe.

It is apparent that if the several layers or plies of thread-windings are applied with their axes perpendicular, as has just been described, not less than three such plies should be formed on the ball to give it a tensile strength of equal degree in every direction. While it is within the scope of our invention to form a ball with any number of plies of latitudinal coils, in practice the number of plies will be three, six, or some other multiple of three. Since no coil crosses any other coil, it is also apparent that each ply is of uniform thickness at all points and that this thickness is equal to the diameter of the thread or the thickness of the yarn or other elongated fibrous material used.

If the ball is elliptical in longitudinal cross section, the axis of one of the windings will be the long axis of the ellipse and the other two axes will be perpendicular thereto at its midway point. However, in producing the ordinary football which is ellipsoidal in shape, it is necessary to wind the material in one or more layers about the long axis only, since the portion of the ball midway of its ends, due to its greater radius of curvature, offers less resistance to internal pressure than the end portions. The end portions may be reinforced by fabric or cord, or both, before the ball is wound or after it is wound, and before the cover is applied.

If it is desired to complete the ball with a rubber cover, the material 32 of the cover is applied to the outermost winding of thread in any suitable manner and the ball is placed in a mold, such as shown at 31, Fig. 7, and a vulcanizing heat applied. If a form 13, such as is shown in Fig. 2, is used in building up the ball, the heat of vulcanization will melt it and it can be drained from the interior of the ball through the valve 12.

Fig. 8 shows the completed ball after removal from the mold. If the face of the mold is formed with the design in relief, the rubber cover of the ball may be molded to have an exterior surface imitative of the grain and seams of a leather-covered ball.

The bladder or thin rubber wall, constituting the innermost wall of the ball in the preferred form of our invention, may be an air-filled bladder, as shown in Fig. 1, or a segmented wall pieced together on a form of solid alcohol or similar material, as shown in Fig. 2, or it may be a one-piece seamless wall 33, Fig. 10, formed by alternately dipping and drying a two-part form of solid alcohol in a bath of latex or of a solution of cured latex until a wall of the desired thickness has been formed, after which the ball is placed in the lathe 19, as shown in Fig. 10, and wound with as many plies of thread as wished. The wall 33 may be cured by vulcanization before or after it is wound with thread.

The thread may be wound upon the ball in a single strand or two or more contiguous strands may be fed to the ball as it turns in the lathe. Fig. 11 is a perspective showing of a ball to which three strands of thread 34 are being fed by a winding machine.

The ball shown in Fig. 8 is made with an integral air-retaining bladder, as has already been described. If it is desired to manufacture a ball in accordance with the principles of our invention which shall have a removable air-retaining bladder, the method of manufacture is somewhat different. The ball is built upon a bladder 35 (Fig. 12) which is inflated through an air valve 12' and is coated with soapstone. A dry uncoated thread 36 (Fig. 13) is fed to this bladder after polar discs 37 have been placed thereon in position under the chucks 21 of the lathe 19. Liquid rubber cement is sprayed from a gun 38 which is moved in timed relationship with the winding machine from which the thread 36 is proceeding, so that the outer surface of the layer of thread will be thoroughly coated with cement after application to the bladder. The inner surface, being dry, does not adhere to the bladder. This spray method of coating the thread may also be used in the methods illustrated in Figs. 1 to 11 and has the advantage of more completely filling the longitudinal, outwardly facing, spaces between the contiguous coils of thread than when pre-coated thread is used.

After the primary winding 24' has been applied, the ball is removed from the lathe, turned through an angle of 90°, replaced in the lathe (see Fig. 14) and a secondary winding 25' applied. For this winding precoated thread may be used or a spray gun 38' may be mounted to apply the rubber cement to the thread at a point between the winding machine and the ball so as to coat all surfaces of the thread, or the gun 38 may be used to spray the cement upon the layer of thread after it is in position upon the ball, as was done in the case of the primary winding. Additional plies of latitudinally wound thread are then built up on the ball in any desired number, and if the ball is to have a rubber cover, the material therefor is placed upon the ball, the ball is inserted in a mold, is further inflated to force it against the inner surface of the mold, and then vulcanized. The ball is removed from the mold, deflated, and cut at 39. The bladder, which, due to its soapstone coating, does not adhere to the thread, is removed and can be repeatedly used for making other balls. Lacing perforations 40 are made at either side of the cut 39, and the ball 41 (Fig. 16) is ready for the insertion of an inflatable bladder over which it can be laced and be made ready for use. It will be understood that a form of solid alcohol may be used instead of the bladder 35 coated with soapstone. It will also be understood that when the ball is to have a leather cover, the bladder and plies of wound thread may be placed in the mold and vulcanized without material for an outer rubber cover. The leather cover is provided with an opening and lacing perforations registering with the cut 39 and perforations 40 and applied in any suitable manner to the ball.

Figs. 17 to 21 depict another method of building plies of latitudinally wound thread or other elongated fibrous material upon the ball. In this method (see Fig. 17), a thread 45 preferably coated with rubber cement is fed from a suitable winding machine (not shown) to a flat receiving turntable 46, beginning at the center of the turntable and continuing until a disc of thread 47 is produced of a diameter sufficient to cover a polar portion 48 of the ball, preferably of 90° from rim to rim, as shown in Fig. 18. Two such turntables 46, with discs 47 in position thereon, are mounted upon opposing mandrels 49 of the lathe 19. A bladder 50 which may be either inflated with air or placed in position upon a form of solid alcohol or similar material, is mounted between the turntables 46, and the discs 47 are spun upon the bladder by a spinning arm 51. The disc of thread will conform perfectly to the bladder as it is spun thereon although the coils of thread will each be separated from adjacent coils by a very small but gradually increasing interval, proceeding outwardly from the poles. This is not true of a polar disc made of woven fabric, as the warp will prevent the separation of the woof strands, or vice versa, and prevent conformation of the disc to the spherical surface of the bladder.

It is possible to make the discs 47 of sufficient diameter that when spun upon the bladder 50 they will extend from pole to equator, completely covering the bladder without leaving any uncovered equatorial portion 52. We prefer, however, to make the discs of a diameter sufficient to reach part-way only from pole to equator, as has been set forth above.

The uncovered equatorial portion 52 of the bladder may now be wound with thread, as has hitherto been described, or pre-formed bands 53 of latitudinally wound thread can be used to cover the equatorial portion of the bladder between the discs 47. Fig. 19 shows a method of making such pre-formed bands 53. Rubberized thread is wound upon a form 54 having the shape and dimensions of the equatorial portion 52 of the bladder, the resultant band 53 is cut on a transverse biased line 55, is removed from the form and applied to the bladder in position between the discs 47 and 48, as shown in Fig. 20. The method just described is then repeated as many times as may be desired to form successive layers of thread, each layer arranged with the axis of its coils perpendicular to the axes of the coils of the last two layers, as shown in Fig. 21.

Instead of cutting the band 53 along the line 55, the form 54 may be of two parts which can be disassembled after the band is wound thereupon, and removed from within the uncut endless band. The bladder 50 can then be partially deflated and the band slipped over it into position between the polar discs 47 and 48.

The equatorial band may be wound in two halves 56 and 57 (Fig. 22) on suitable forms and applied as shown in Fig. 23.

Figs. 24 to 26 illustrate still another method of applying latitudinally arranged coils of thread to form the reinforcing layer of an athletic ball. A hemispherical form 58 is mounted on the mandrel 49 of the lathe 19 and thread 59 is fed to the revolving form, beginning at a pole 60 and terminating at an equator 61 of the form. Two hemispherical cups 62 (Fig. 25) thus formed are assembled upon a bladder 63 or form of solid alcohol, and the ball is built from that point by adding other layers of latitudinally arranged thread by repeating this last described process or any one of the other processes heretofore described. The two hemispherical cups may be covered both inside and out with raw rubber stock 64 (see Fig. 27) placed in mating position in a mold to form a sphere and vulcanized.

Fig. 28 shows a solid form 65 upon which is placed rubber stock to form a hemispherical bladder cup 66. Thread 67 is wound thereon (Fig. 29) to form a hemispherical cup 68 (Fig. 30) having a rubber lining 66, two of which can be assembled as shown in Fig. 31 to form a sphere ready for vulcanization or for the application of other layers of thread, as shown in Fig. 32.

It is obvious that the various layers of coils of latitudinally wound thread, or other elongated reinforcing material, may be successively applied to the ball with the axis of the coils of one layer at any angle to the axis of the coils of the preceding or following layers and need not be perpendicular thereto, as has been above specified in describing the preferred embodiment of our invention.

The essence of our invention resides in the latitudinal arrangement of coils of elongated reinforcing material to resist tensile stresses circumferentially of the ball. While the embodiments of our invention above described are inflatable hollow athletic balls, it is obvious that the essential feature of latitudinally wound elongated reinforcing material can be utilized in the manufacture of solid balls, such as baseballs.

A winding which will present an even surface upon which to fit a cover is especially desirable in the soft ball type of baseball.

If a leather covered basket ball, football or soccer ball is manufactured with an underlying reinforcing layer constructed in accordance with our invention, the thickness of the leather casing may be substantially less than is the present practice, since this reinforcing layer acts to resist the internal air pressure, which in balls as at present constructed is withstood by a heavy thick leather cover. Thin leather stock may be cut in panels, which will lie flat on the surface of the balls, and these panels may be fixed in position by vulcanization or by the use of an adhesive.

If it is desired to produce a ball covered with a relatively thick layer of leather, but without the use of seams, the leather stock may be cut into narrow strips which may be coated on one side and both edges with suitable cement and wound upon the ball in latitudinal coils, the edge of one coil contacting and cemented to the edge of adjacent coils.

While our method of winding elongated material is especially effective to produce a means for reinforcement against circumferential strains in balls, it is also effective to produce walls to provide rigidity, weight or other qualities in objects having the shape of spheres, hemispheres or portions of spheres or spheroids. The elongated material need not be fibrous. Wire, for example, may be wound upon spherical objects in accordance with the principles of our invention.

While we have described several embodiments of our invention, we do not wish to be limited to these embodiments but have defined our invention in the following claims.

We claim as our invention:

1. A method for making a reinforcing layer for an athletic ball comprising: taking a body of the shape of the completed ball; applying discs of coiled thread to said body at two opposite polar points; placing said body in a lathe with said discs under the chucks of said lathe; winding thread upon said body in contiguous latitudinal coils from the edge of one of said discs to the edge of the other of said discs, said thread being coated with rubber cement; and removing said body and windings from said lathe.

2. A method of making an athletic ball comprising: taking a body of the shape of the completed ball; making flat discs of coiled elongated fibrous material; and spinning two of said discs upon said body with the centers of said discs lying upon two opposite polar points of said body respectively.

3. A method of making an athletic ball comprising: taking a body of the shape of the completed ball; making flat discs of coiled elongated fibrous material; spinning two of said discs upon said body with the centers of said discs lying upon two opposite polar points of said body respectively, each of said discs being of a diameter such that the spun disc extends over approximately a 90° arc upon said body; and applying a plurality of coiled latitudinal windings of elongated fibrous material to the equatorial region between said discs.

4. A method of making an athletic ball comprising: taking a body of the shape of the completed ball; making flat discs of coiled elongated fibrous material; spinning two of said discs upon said body with the centers of said discs lying upon two opposite polar points of said body respectively, each of said discs being of a diameter such that the spun disc extends over approximately a 90° arc upon said body; and winding elongated fibrous material in contiguous latitudinal coils upon the equatorial region of said body between the edges of said discs.

5. A method of making an athletic ball comprising: taking a body of the shape of the completed ball; making flat discs of coiled elongated fibrous material; spinning two of said discs upon said body with the centers of said discs lying upon two opposite polar points of said body respectively, each of said discs being of a diameter such that the spun disc extends over approximately a 90° arc upon said body; winding elongated fibrous material upon a form of the shape and size of the equatorial region of said body to form a spheroidal band; cutting and removing said band from said form; and applying said band to said equatorial region of said body.

6. A method of making a hollow athletic ball, comprising: inflating a rubber bladder having an inflating valve; coating said bladder with rubber cement; applying discs of fibrous material to two opposite poles of said bladder; placing said bladder in a turning lathe with the discs under the chucks of said lathe; winding rubberized thread upon said bladder in contiguous latitudinal spiral coils from the edge of one of said discs to the edge of the other of said discs; removing said bladder and windings from said lathe; applying two additional discs of fibrous material to the bladder at two opposite poles, the axis of which is at a substantial angle to the axis of said first mentioned poles; reinserting said bladder in a lathe with said additional discs under the chucks of the lathe; winding rubberized thread upon said bladder in contiguous latitudinal spiral coils from the edge of one of said additional discs to the edge of the other of said additional discs; removing said bladder and windings from the lathe; applying material for a cover to said wound bladder; and vulcanizing said bladder, said rubberized thread, and said cover into one united structure.

WILLIAM J. VOIT.
LEITH C. WEIMER.